United States Patent [19]

Wakamatsu et al.

[11] Patent Number: 5,489,662

[45] Date of Patent: Feb. 6, 1996

[54] PROCESS FOR THE PREPARATION OF ORGANOSILICON POLYMER

[75] Inventors: Shigeru Wakamatsu; Keiji Kabeta; Takafumi Imai, all of Tokyo, Japan

[73] Assignee: Toshiba Silicone Co., Ltd., Tokyo, Japan

[21] Appl. No.: 298,750

[22] Filed: Aug. 31, 1994

[30] Foreign Application Priority Data

Sep. 1, 1993 [JP] Japan .................... 5-217409

[51] Int. Cl.⁶ ..................... C08G 77/18
[52] U.S. Cl. ............ 528/14; 528/32; 528/35; 528/40; 528/43
[58] Field of Search ............... 528/14, 35, 32, 528/40, 43

[56] References Cited

U.S. PATENT DOCUMENTS

| | | | |
|---|---|---|---|
| 3,520,948 | 7/1970 | Cuthill | 528/35 |
| 4,889,904 | 12/1989 | Burns | 528/25 |
| 5,023,307 | 6/1991 | Burns | 528/29 |

FOREIGN PATENT DOCUMENTS

| | | | |
|---|---|---|---|
| 4218533 | 8/1992 | Japan | C08G 77/60 |
| 4342726 | 11/1992 | Japan | C08G 77/60 |
| 4348128 | 12/1992 | Japan | C08G 77/48 |

OTHER PUBLICATIONS

M. Ishikawa et al, "Polymeric Organosilicon Systems", Organometallics, vol. 11, No. 4, Apr. 1992, pp. 1604–1608.
H. Yamashita et al, "Reconstruction of Backbones of Silicon Polymers by Palladium–Catalyzed Insertion of Quinones into Silicon–Silicon Bonds", Macromolecules, vol. 26, No. 8, Apr. 12, 1993, pp. 2143–2144.
R. D. Miller, "Polysilane High Polymers", Chemical Reviews, Sep./Oct., 1989, vol. 89, No. 6, pp. 1359–1410.

*Primary Examiner*—Melvyn I. Marquis
*Attorney, Agent, or Firm*—Sughrue, Mion, Zinn, Macpeak & Seas

[57] ABSTRACT

A process for the preparation of an organosilicon polymer, which comprises reacting one equivalent of a bis(alkoxysilyl) compound represented by the following general formula:

$$R^1R^2R^3Si-(A)_p-SiR^1R^2R^3$$

wherein $R^1$, $R^2$ and $R^3$ each represents the same or different substituted or unsubstituted monovalent hydrocarbon group or an alkoxy group, with the proviso that at least one of $R^1$, $R^2$ and $R^3$ is an alkoxy group; A represents a divalent aromatic group, a divalent conjugated or nonconjugated unsaturated aliphatic group, or a divalent saturated aliphatic group; and p represents an integer of 1 or more, with one or more equivalents of an alkoxydisilane represented by the following general formula:

$$(OR^4)_{6-n}Si_2(R^5)_n$$

wherein $R^4$ and $R^5$ each represent the same or different substituted or unsubstituted monovalent hydrocarbon group; and n represents an integer of from 0 to 5, in the presence of an alkali metal alkoxide represented by the following general formula:

$$MOR^6$$

wherein M represents an alkali metal; and $R^6$ represents a substituted or unsubstituted monovalent hydrocarbon group.

6 Claims, 2 Drawing Sheets

PROCESS FOR THE PREPARATION OF ORGANOSILICON POLYMER

FIELD OF THE INVENTION

The present invention relates to a safe and simple process for the preparation of a novel and useful organosilicon polymer.

BACKGROUND OF THE INVENTION

It is known that a polyorganosilane is useful as an electrically conductive organic material, a nonlinear optical material, a photodecomposable reaction initiator, a silicon carbide precursor, a photoresist material or the like (see Miller, R. D.; Michl. J., Chem. Rev., 89, 1359 (1989)).

The Wurtz method using an organohalosilane or organohalodisilane as a starting material has been widely used as a process for the preparation of a polyorganosilane. However, the Wurtz method is disadvantageous in that the use of metallic sodium or metallic potassium, which are self-igniting, in the air involves some risk, the reaction conditions are too severe to control the molecular weight of the product, and a polyorganosilane having a bimodal distribution of molecular weight is obtained.

In order to overcome these disadvantages, some approaches have been attempted. For example, Shono et al. obtained silicone polymers having organic groups comprising atoms and atomic groups other than silicon incorporated in the main chain having weight-average molecular weight of 5,000 to 18,000 by an electrode reaction using bis(halosilyl) compounds as starting materials (JP-A-4-348128 (The term "JP-A" as used herein means an "unexamined published Japanese patent application")). Asuke et al. obtained a silicon polymer having a benzene ring incorporated in its main chain by reacting dichlorosilane with dilithiobenzene in a proportion of 1:1 (JP-A-4-342726). Ishikawa et al. obtained an electrically conductive polymer having a thienyl group incorporated in its main chain by polymerizing a bis(5-halogen magnesium thiophene) silane derivative in the presence of a nickel catalyst (JP-A-4-218533).

Further, Ishikawa et al. obtained a polymer having ethynylene incorporated in its main chain by allowing a cyclic silane derivative containing ethynylene to undergo ring opening polymerization (Organometallics 1992. 11. 1604–1618). Kashizaki et al. obtained a polysilane copolymer soluble in an organic solvent by conducting the Wurtz reaction of a dichlorosilane monomer with an α,α'-dichloroxylene derivative. Yamashita et al. obtained silicon polymers having quinone incorporated in an Si—Si bond by reacting disilanylene polymers with quinones (Macromolecules 1993. 26. 2143–2144).

The disproportionation reaction using an alkoxydisilane is advantageous in that the reaction can be effected under mild conditions without using metallic sodium or metallic potassium. Up to this date, the disproportionation reaction has provided various polyorganosilanes. However, taking into account the utilization in a nonlinear optical material, a photoresist, particularly to an electrically conductive material, etc., it is proposed that by employing a branched or network structure rather than the above-described straight-chain polyorganosilanes, the HOMO-LUMO energy band gap of the polymer is narrowed, enhancing the usefulness as an electrically conductive material. Further, the content of the three-dimensional element in the structure can be raised to enhance the heat resistance of the polymer itself. For such utilization, easy synthesis of silicon polymers having a greater variety of branched or network structures has been desired.

It is possible that such a variety of polyorganosilanes and copolymers are obtained by introducing desired organic groups into silane derivatives as starting materials so that they undergo reaction as conducted by Ishikawa et al. above. However, when such silane derivatives are obtained, difficulties are found. For example, the undesirable reaction of the organic group to be introduced into the silane derivative makes it difficult to selectively introduce the organic group into the silane derivative. Further, the resulting silane derivative can be hardly purified. Moreover, since the reactions proposed by Asuke et al. and Kashizaki et al. require the use of a large amount of metallic lithium or metallic sodium, the mass production of these organosilicon polymers on an industrial basis is difficult.

On the other hand, although chlorosilanes having various organic groups are easily available, methods for obtaining polyorganosilanes from such chlorosilanes in a safer and easier manner by utilizing a catalytic reaction are not known.

SUMMARY OF THE INVENTION

Taking into account such a circumstance, an object of the present invention is to provide a simple and safe process for the preparation of an organosilicon polymer having various organic groups which can be easily used as the above-described material from easily available disilanes and bis(alkoxysilyl) compounds by a one or single pot method.

To this end, the inventors made extensive studies. As a result, it was found that the above problems can be overcome by subjecting a disilane compound and a bis(alkoxysilyl) compound to disproportionation reaction in the presence of an alkali metal alkoxide. Thus, the present invention has been attained based on this finding.

The present invention provides a process for the preparation of an organosilicon polymer, which comprises reacting one equivalent of a bis(alkoxysilyl) compound represented by the following general formula (I):

$$R^1R^2R^3Si—(A)_p—SiR^1R^2R^3 \qquad (I)$$

wherein $R^1$, $R^2$ and $R^3$ each represents the same or different substituted or unsubstituted monovalent hydrocarbon group, or an alkoxy group, with the proviso that at least one of $R^1$, $R^2$ and $R^3$ is an alkoxy group; A represents a divalent aromatic group, a divalent conjugated or nonconjugated unsaturated aliphatic group or a divalent saturated aliphatic group; and p represents an integer of 1 or more, with one or more equivalents of an alkoxydisilane represented by the following general formula (II):

$$(OR^4)_{6-n}Si_2(R^5)_n \qquad (II)$$

wherein $R^4$ and $R^5$ each represents the same or different substituted or unsubstituted monovalent hydrocarbon group; and n represents an integer of from 0 to 5, in the presence of an alkali metal alkoxide represented by the following general formula (III):

$$MOR^6 \qquad (III)$$

wherein M represents an alkali metal; and $R^6$ represents a substituted or unsubstituted monovalent hydrocarbon group.

DETAILED DESCRIPTION OF THE INVENTION

Figure 1:
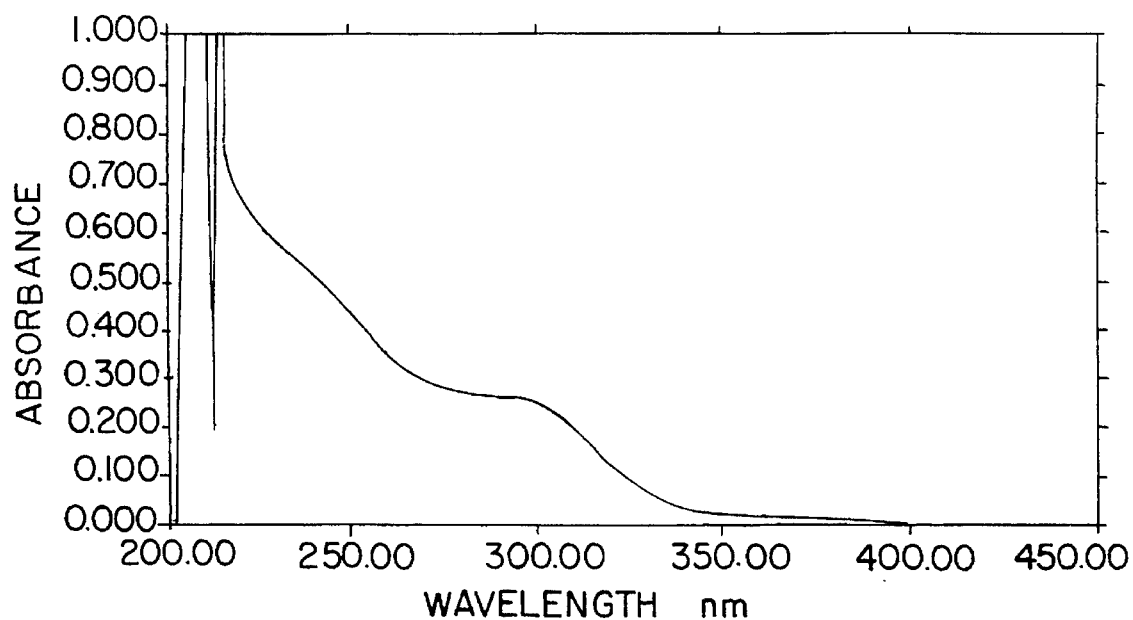
FIG. 1 is a UV chart of an organosilicon polymer solution obtained in Example 1.

The organosilicon polymer prepared according to the present invention is a novel silicon polymer having a branched or network structure comprising structural units represented by the following general formulae (IV) to (IX):

  (IV)

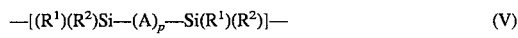  (V)

  (VI)

  (IX)

  (VIII)

  (IX)

wherein $R^1$, $R^2$, $R^5$, A and p are the same as defined above, with the proviso that the number of moles of the structural unit (IV) is greater than the sum of the number of moles of structural units (V) to (IX), and having two or more Si—Si bonds in each molecular chain.

This silicon polymer is easily soluble in an aromatic solvent such as toluene, benzene or xylene, a halogenated solvent such as dichloromethane, dichloroethane, chloroform or carbon tetrachloride, and other solvents such as tetrahydrofuran and dioxane. The solubility of the silicon polymer in these solvents can be attained by decreasing the crosslinked component represented by the general formula (IV) and properly selecting the component represented by A to be introduced or the kind of the substituent represented by R. The solubility of the silicon polymer depends on the number of alkoxy groups in the disilane and bissilyl compounds used in the stage of synthesis, the reaction temperature, the kind of the bissilyl compound, and the reaction conditions. The higher the reaction temperature is, or the greater the number of alkoxy groups in the starting material, the greater is the crosslinked component, i.e., the lower is the solubility of the resulting silicon polymer.

Examples of the substituted or unsubstituted monovalent hydrocarbon group connected to a silicon atom as $R^5$ in the alkoxydisilane (II) used as a starting material in the present invention include a straight-chain or branched alkyl group such as methyl, ethyl, propyl, butyl, pentyl, hexyl, octyl, decyl, dodecyl or octadecyl, a cycloalkyl group such as cyclohexyl, an aralkyl group such as benzyl, 2-phenylethyl, 2-phenylpropyl or 3-phenylpropyl, an aryl group such as phenyl, tolyl or mesityl, an alkenylaryl group such as p-vinylphenyl or p-(2-propenyl)phenyl, an arylalkenyl group such as styryl, a halogenated hydrocarbon group such as chloropropyl, chlorophenyl or 3,3,3-trifluoropropyl, and various substituted hydrocarbon groups such as p-methoxyphenyl. These substituted or unsubstituted monovalent hydrocarbon groups may be the same or different. Particularly preferred among these hydrocarbon groups is a methyl group from the standpoint of ease of synthesis.

$R^4$ is a monovalent hydrocarbon group constituting the alkoxy group as a silicon functional group. Examples of the monovalent hydrocarbon group include an alkyl group such as methyl, ethyl, n-propyl, isopropyl, n-butyl or tert-butyl, a cycloalkyl group such as cyclohexyl, an aryl group such as phenyl or tolyl, and an alkenyl group such as allyl. Preferred among these monovalent hydrocarbon groups is an alkyl group such as methyl, ethyl, n-propyl or isopropyl, more preferably methyl or ethyl, from the standpoint of ease of synthesis and reactivity.

Specific examples of the alkoxydisilane (II) include a monomethoxydisilane such as pentamethylmethoxydisilane, pentaethylmethoxydisilane, 1,1,1,2-tetramethyl-2-n-hexyl-2-methoxydisilane, 1,1,1,2-tetramethyl-2-phenyl-2-methoxydisilane, 1,1,1,2-tetramethyl-2-vinyl-2-methoxydisilane, 1,1,1,2-tetramethyl-2-cyclohexyl-2-methoxydisilane, 1,1,1,2 -tetramethyl-2-tert-butyl-2-methoxydisilane, 1,1,1 -trimethyl- 2,2-diphenyl-2-methoxydisilane, 1,1,1-trimethyl-2,2-di-n-hexyl- 2-methoxydisilane, 1,1,2,2-tetramethyl-1-phenyl-2-methoxydisilane, 1,1,2-trimethyl-1,2-diphenyl-2-methoxydisilane, 1,1-dimethyl-1,2,2-triphenyl-2-methoxydisilane, 1,2,2-trimethyl-1,1-diphenyl-2-methoxydisilane, 1,2,2-triethyl-1,1-diphenyl-2-methoxydisilane, 1,2-dimethyl-1,1,2-triphenyl-2-methoxydisilane or 1-methyl- 1,1,2,2-tetraphenyl-2-methoxydisilane; a 1,2-dimethoxydisilane such as 1,1,2,2-tetramethyl-1,2-dimethoxydisilane, 1,1,2,2 -tetraethyl-1,2-dimethoxydisilane, 1,1,2,2-tetraphenyl-1,2-dimethoxydisilane or 1,1-dimethyl-2,2-diphenyl-1,2 -dimethoxydisilane; a 2,2-dimethoxydisilane such as 1,1,1,2 -tetramethyl-2,2-dimethoxydisilane, 1,1,1-trimethyl-2-phenyl- 2,2-dimethoxydisilane, 1,1,2-trimethyl-1-phenyl-2,2-dimethoxydisilane, 1,1-dimethyl-1,2-diphenyl-2,2-dimethoxydisilane, 1,2-dimethyl-1,1-diphenyl-2,2-dimethoxydisilane, 1-methyl-1,1,2-triphenyl-2,2-dimethoxydisilane, 2-methyl-1,1,1-triphenyl-2,2-dimethoxydisilane or 1,1,1,2-tetraphenyl-1-2, 2dimethoxydisilane; a 1,2,2-trimethoxydisilane such as 1,1,2 -trimethyl-1,2,2-trimethoxydisilane, 1,1-dimethyl-2-phenyl- 1,2,2-trimethoxydisilane, 1,2-dimethyl-1-phenyl-1,2,2 -trimethoxydisilane, 1-methyl- 1,2-diphenyl-1,2,2-trimethoxydisilane, 2-methyl- 1,1-diphenyl-1,2,2-trimethoxydisilane or 1,1,2-triphenyl-1,2,2-trimethoxydisilane; a 2,2,2-trimethoxydisilane such as 1,1,1-trimethyl-2,2,2-trimethoxydisilane, 1,1-dimethyl-1-phenyl-2,2,2-trimethoxydisilane, 1-methyl-1,1-diphenyl-2,2,2-trimethoxydisilane or 1,1,1-triphenyl-2,2,2-trimethoxydisilane, a 1,1,2,2-tetramethoxydisilane such as 1,2-dimethyl-1,1,2,2-tetramethoxydisilane, 1-methyl-2-phenyl-1,1,2,2-tetramethoxydisilane or 1,2-diphenyl-1,1,2,2-tetramethoxydisilane; a 1,2,2,2-tetramethoxydisilane such as 1,1-dimethyl-1,2,2,2-tetramethoxydisilane, 1-methyl-1-phenyl- 1,2,2,2-tetramethoxydisilane or 1,1-diphenyl-1,2,2, 2-tetramethoxydisilane; a pentamethoxydisilane such as methylpentamethoxydisilane or phenylpentamethoxydisilane; a hexamethoxydisilane; and compounds obtained by replacing a part or whole of the methoxy groups in these compounds by other alkoxyl groups such as ethoxy, n-propoxy or isopropoxy.

The alkoxydisilane (II) can be synthesized by a conventional method such as alkoxylation of a halogenated disilane, introduction of an organic group other than an alkyl group into a halogenated disilane or alkoxylated disilane by an organic metallic reagent, and chlorination of an alkyldisilane or aryldisilane followed by alkoxylation thereof. For example, the reaction described in detail in "Jikken Kagaku Koza (Institute of Experimental Chemistry)", vol. 12, Organic Metal Compound (Maruzen), 3rd. ed., chapter 16, pp. 331–377 can be employed. Among these alkoxydisilanes, chlorinated disilanes can be obtained, e.g., as a by-product of the direct synthesis of organochlorosilanes or a product of the redistribution reaction of the by-product.

In the bis(alkoxysilyl) compound (I) used as the other starting material, $R^1$, $R^2$ and $R^3$ each represents an alkoxy group or the same functional group as in $R^4$ or $R^5$ in the alkoxydisilane (II). In the latter case, the functional group is preferably an alkyl group such as methyl, ethyl or isopropyl, more preferably methyl or ethyl, from the standpoint of ease of synthesis and reactivity. Examples of the group represented by A include a divalent aromatic group such as phenylene, naphthylene, biphenylene, divalent furan, divalent thiophene or divalent cyclopentane; a divalent aromatic group such as divalent pyrrole; a divalent unsaturated aliphatic group such as ethenylene or ethynylene; a divalent conjugated unsaturated aliphatic group such as 1,3-butanedienylene, 1,3,5-heptatrienylene or 1,3,5,7-octatetraenylene; and a divalent saturated aliphatic group such as methylene, ethylene, propylene and butylene. Preferred among these groups are methylene, ethylene and phenylene from the standpoint of ease of synthesis and reactivity.

Specific examples of the bis(alkoxysilyl) compound include a bis(alkoxysilyl) benzene such as bis(trimethoxysilyl) benzene, bis(triethoxysilyl)benzene, bis(methyldimethoxysilyl) benzene, bis(methyldiethoxysilyl) benzene, bis(ethyldiethoxysilyl) benzene, bis(diethylethoxysilyl) benzene, bis(phenyldiethoxysilyl) benzene, bis(phenyldimethoxysilyl) benzene, bis(diphenylethoxysilyl) benzene, bis(diphenylmethoxysilyl) benzene, bis(ethoxydimethoxysilyl)benzene and bis(methoxydiethoxysilyl) benzene, bis(alkoxysilyl) ethylene such as bis(trimethoxysilyl) ethylene, bis(triethoxysilyl) ethylene, bis(methyldimethoxysilyl) ethylene, bis(methyldiethoxysilyl) ethylene, bis(dimethylethoxysilyl) ethylene, bis(ethyldiethoxysilyl) ethylene, bis(diethylethoxysilyl) ethylene, bis(phenyldiethoxysilyl) ethylene, bis(phenyldimethoxysilyl) ethylene, bis(diphenylethoxysilyl) ethylene, bis(diphenylmethoxysilyl) ethylene, bis(ethoxydimethoxysilyl)ethyleneorbis(methoxydiethoxysilyl) ethylene; a bis(alkoxysilyl) ethenylene such as bis(trimethoxysilyl) ethenylene, bis(triethoxysilyl) ethenylene, bis(methyldimethoxysilyl) ethenylene, bis(methyldiethoxysilyl) ethenylene, bis(dimethylethoxysilyl) ethenylene, bis(ethyldiethoxysilyl) ethenylene, bis(diethylethoxysilyl) ethenylene, bis(phenyldiethoxysilyl) ethenylene, bis(phenyldimethoxysilyl) ethenylene, bis(diphenylethoxysilyl) ethenylene, bis(diphenylmethoxysilyl) ethenylene, bis(ethoxydimethoxysilyl) ethenylene, bis(methoxydiethoxysilyl) ethenylene or a bis(alkoxysilyl) thiophene, and compounds obtained by replacing a part or whole of alkoxy groups in these compounds by other alkoxy groups such as n-propoxy or isopropoxy.

On the other hand, examples of the metal M in the alkali metal alkoxide (III) used as a catalyst in the present invention are lithium, sodium, potassium, rubidium and cesium, preferably lithium, sodium or potassium, from the standpoint of availability. Examples of the monovalent hydrocarbon group represented by $R^6$ include the same groups as in $R^5$. Lower alkyl groups such as methyl, ethyl and tert-butyl are preferred from the standpoint of reactivity.

Specific examples of the alkali metal alkoxide (III) used in the present invention include sodium methoxide, sodium ethoxide, and potassium-tert-butoxide. Further, a lithium alkoxide synthesized from n-butyryl lithium and an alcohol in the reaction system may be used as it is.

The amount of the alkali metal alkoxide (III) used is not specifically limited but may be in the range of from 0.001 to 50 mol % per mole of the disilane used. However, if the amount of the catalyst used is too small, the reaction is too slow. On the contrary, if the amount of the catalyst used is too large, it not only makes it difficult to remove the catalyst after reaction but also gives an economic disadvantage. Thus, the amount of the catalyst to be used is preferably in the range of 0.1 to 30 mol % per mole of the alkoxydisilane (II).

The number of alkoxy groups in the alkoxysilane (II) or the bis(alkoxysilyl) compound (I) is selected by the molecular structure and molecular weight of the desired organosilicon polymer. For example, the disproportionation reaction of monoalkoxydisilane or 1,2-dialkoxydisilane with a bis(mono, di or trialkoxysilyl) compound can provide a chain or cyclic substituted silicon polymer. Further, the use of a disilane having two or more alkoxy groups connected to the same silicon atom per molecule or a bis(dialkoxysilyl) compound or bis(trialkoxysilyl) compound as a starting material can provide a branched or network organosilicon polymer.

Moreover, as necessary, the organosilicon polymer having various organic groups can be synthesized by employing various combinations of two or more alkoxydisilane and bis(alkoxysilyl) compounds as starting materials.

The above reaction can be accomplished by adding the alkali metal alkoxide (III) to a mixture of the alkoxydisilane (II) and the bis(alkoxysilyl) compound (I) so that they undergo reaction. The method for mixing the starting materials is arbitrary. In order to avoid the sudden initiation of reaction, the alkoxydisilane or alkaline metal alkoxide may be slowly added to the system. Further, a solvent is preferably used to ensure a smooth progress of the reaction. Examples of the solvent include a hydrocarbon solvent such as toluene, xylene, n-hexane, n-heptane and cyclohexane, an ether solvent such as diethyl ether, tetrahydrofuran, 1,4-dioxane, ethylene glycol dimethyl ether, ethylene glycol diethyl ether or diethylene glycol dimethyl ether; and an aprotic polar solvent such as dimethylformamide, dimethylsulfoxide or hexamethylphosphoric triamide.

The preparation process of the present invention is effected free from water because the alkoxydisilane, alkali metal alkoxide and bis(alkoxysilyl) compound used as starting materials, and by-produced alkoxysilane, all become decomposable when reacted with water. The reaction is normally effected at a temperature of from −80° C. to 250° C., preferably from 20° C. to 100° C. The reaction temperature can be determined by the relationship among the disilane as the starting material, a reaction solvent, an amount of catalyst and a molecular weight of the desired organosilicon polymer.

The reaction is preferably effected under atmospheric pressure. However, a higher or lower pressure may be employed, if required and necessary.

The organosilicon polymer obtained by the reaction can be isolated by removing the catalyst, the by-produced alkoxysilanes and the unreacted bis(alkoxysilyl) compound.

In accordance with the present invention, an organosilicon polymer having arbitrary organic groups connected to a silicon atom can be synthesized by arbitrarily selecting one or more substituents having alkoxydisilane (II) used as a starting material (or starting materials) in the molecule thereof and one or more substituents having bis(alkoxysilyl) compound (I) used as a starting material (or starting materials) in the molecule thereof. In particular, where the synthesis of an alkoxydisilane is difficult, where the purification of an alkoxydisilane is difficult because substituents on the alkoxydisilane are thermally unstable, or where reactive organic groups in the resulting organosilicon polymer are thermally unstable, substituents can be safely and easily introduced into the desired organosilicon polymer.

Since the organosilicon polymer obtained according to the present invention has a branched or network structure having many Si—Si bonds, it exhibits an excellent electrical conductivity and heat resistance and thus is useful as an electrically conductive organic material, a nonlinear optical material, a photodecomposable reaction initiator, a precursor of silicon carbide ceramics, a photoresist material, etc. In particular, the polymer has a network structure and thus is useful as an electrically conductive material.

The organosilicon polymer having a reactive organic group, particularly an unsaturated group, in its molecule obtained according to the present invention can be used as a starting material from which an organosilicon polymer having a higher molecular weight can be obtained according to a conventional method.

The present invention will be further described in more detail by reference to the following Examples, but it should be understood that the present invention is not deemed to be limited thereto. All percents, parts, ratios and the like are by weight unless otherwise indicated. In the Examples, the following abbreviations are used.

Me: methyl group; Et: ethyl group; Ph: phenyl group

EXAMPLE 1

In a stream of dried argon gas, 100 parts of sodium ethoxide and 280 parts of bis(trimethoxysilyl) benzene were charged into an eggplant type flask equipped with a condenser and a Y-tube where they were stirred at room temperature. To the resulting mixture was then added dropwise 1,1,2,2-tetramethyl-1,2-diethoxydisilane (purity: 90%; containing 10% of 1,1,2-trimethyl-1,2,2-triethoxydisilane) in an amount equivalent to that of bis(trimethoxysilyl) benzene. The resulting mixture was then reacted at a temperature of 100° C. for 18 hours. The reaction mixture was then measured by gas chromatography (filler: SE30). As a result, the peak of disilane which was a starting material dissapeared, and the peaks of dimethyldiethoxysilane and some amount of methyltriethoxysilane were observed. The reaction mixture thus obtained was cooled to room temperature. The reaction mixture was then slowly added to methanol. As a result, a white precipitate was obtained. The catalyst and the unreacted bis(trimethoxysilyl) benzene were then removed by filtration with suction to obtain 160 parts of an organosilicon polymer.

The organosilicon polymer thus obtained was measured by $^1$H-NMR (CDCl$_3$, δ). As a result, signals were observed at 0.40 (br. s, 18H, SiMe), 0.90 (m, 1.5H, SiOEt), 1.20 (t, J=7Hz, 4.5H, SiOEt), 3.60 (s, 2.3H, SiOMe), 3.80 (q, J=7Hz, 1.5H, SiOEt), and 7.10 (d, J=3Hz, Ph). The organosilicon polymer was analyzed by gel permeation chromatography. As a result, the organosilicon polymer had a weight average molecular weight (Mw) of 4,160, and a Mw/Mn (number average molecular weight) ratio of 1.34 (calculated as a polystyrene). Thus, an organosilicon polymer having a substituent ratio (A:OR:Me) of 1:3:18 by number (A=CH$_2$(C$_6$H$_4$)CH$_2$—) was obtained. The polymer thus obtained was measured for UV spectrum. As a result, a tailing to the vicinity of 400 nm was observed which shows a good conformity to the UV spectrum inherent to a network polysilane proposed by Bianconi et al. (J. Am. Chem. Soc. 1988, 110.2342). The UV chart of the polymer solution thus obtained (10$^{-5}$ g of polymer/1,000 ml of THF) is shown in FIG. 1.

EXAMPLE 2

The same procedure as in Example 1 was followed except that bis(triethoxysilyl) hexane was used, and the reaction was conducted at room temperature for 12 hours. As a result, 195 parts of an organosilicon polymer was obtained.

Figure 2:
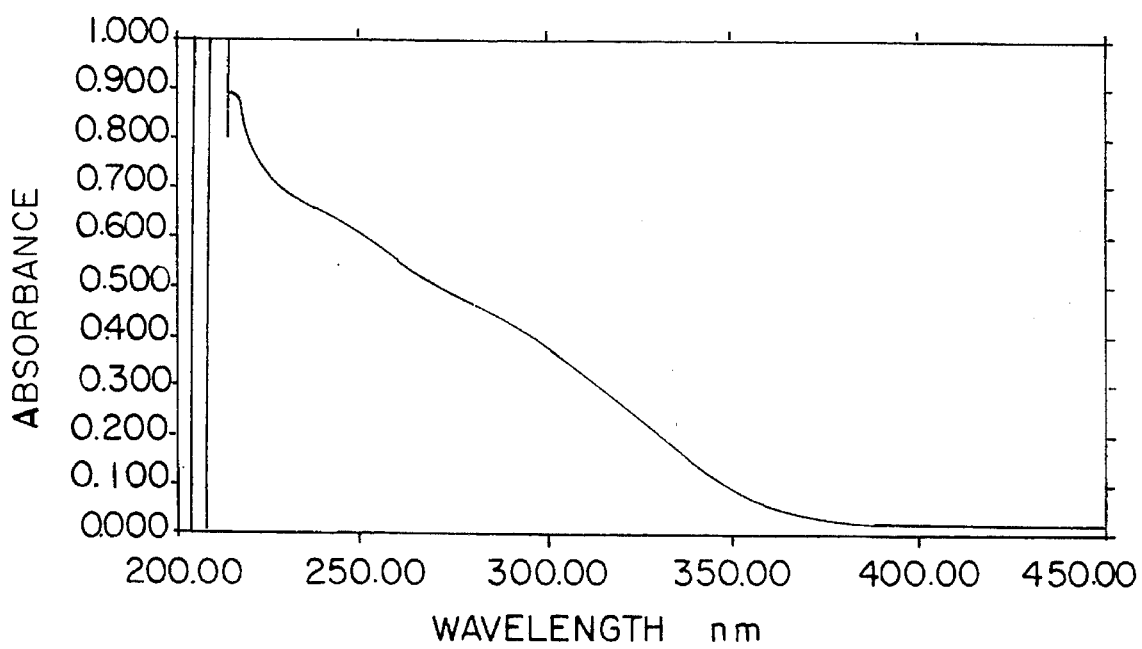
FIG. 2 is a UV chart of an organosilicon polymer solution obtained in Example 2.

The organosilicon polymer thus obtained was measured by $^1$H-NMR (CDCl$_3$, δ). As a result, signals were observed at 0.4 (br. s, 15H, SiMe), 1.20 (t, J=7Hz, 5H, SiOEt and SiCH$_2$), 3.55 (s, 2H, SiOMe) and 3.80 (q, J=7Hz, 3H, SiOEt). The organosilicon polymer had an Mw of 20,300 and a Mw/Mn of 2.85 (calculated as a polystyrene). The substituent ratio (A:OR:ME) by number was 2:5:15 (A=—(CH$_2$)$_6$—). The UV spectrum of the product showed that it was a network polymer. The UV chart of the polymer solution thus obtained (10$^{-5}$ g of polymer/1,000 ml of THF) is shown in FIG. 2.

EXAMPLE 3

The same procedure as in Example 1 was followed except that bis(trimethoxysilyl) ethane was used, and the reaction was conducted at a temperature of 100° C. for 12 hours. As a result, 86 parts of an organosilicon polymer was obtained.

Figure 3:
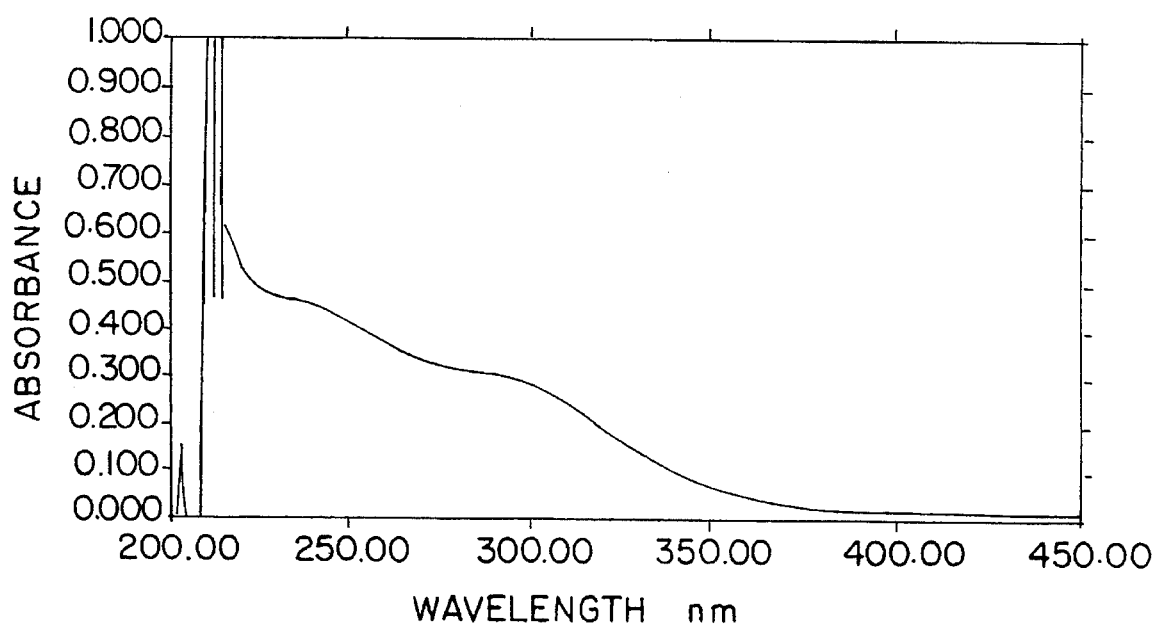
FIG. 3 is a UV chart of an organosilicon polymer solution obtained in Example 3.

The organosilicon polymer thus obtained was measured by $^1$H-NMR (CDCl$_3$, δ). As a result, signals were observed at 0.4 (br. s, 15H, SiMe), 1.20 (t, J=7Hz, 4H, SiOEt and SiCH$_2$), 3.55 (s, 2H, SiOMe) 3.80 (q, J=7Hz, 3H, SiOEt), and 7.10 (d, J=3Hz, Ph). The organosilicon polymer had a Mw of 5,100 and a Mw/Mn of 1.59 (calculated as a polystyrene). The substituent ratio (A:OR:Me) by number was 2:5:17 (A=—(CH$_2$)$_2$—). The UV spectrum of the product showed that it was a network polymer. The UV chart of the polymer solution thus obtained (10$^{-5}$ g of polymer/1,000 ml of THF) is shown in FIG. 3.

EXAMPLE 4

The same procedure as in Example 1 was followed except that bis(thiethoxysilyl)ethane was used, and the reaction was conducted at a temperature of 100 ° C. for 12 hours. As a results, 120 parts of an organosilicon polymer was obtained.

Figure 4:
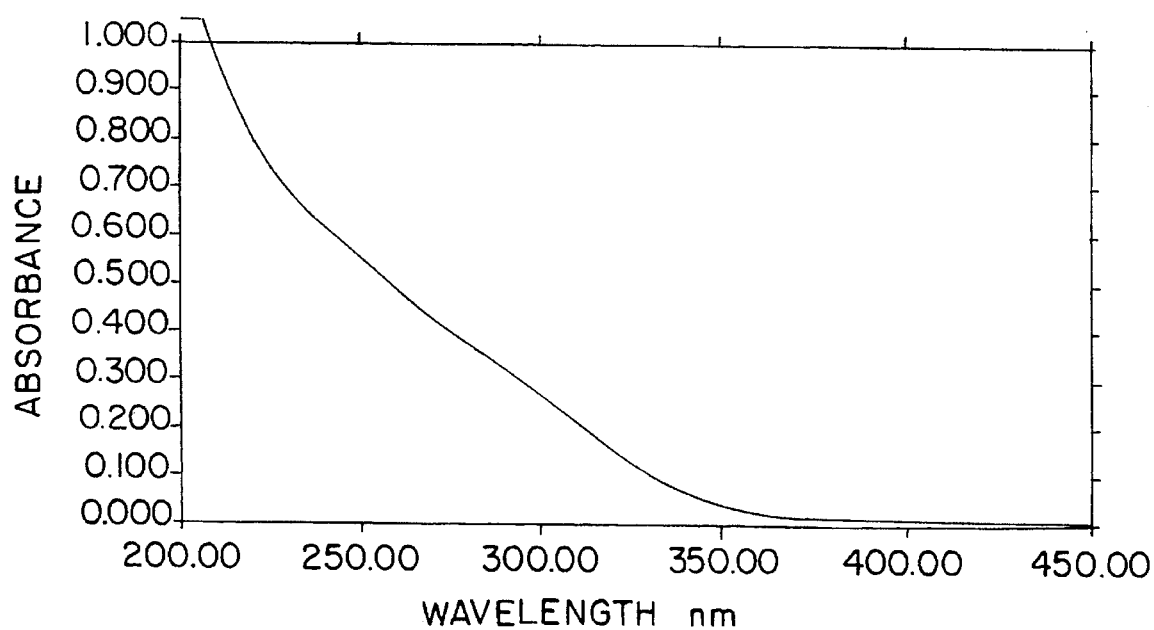
FIG. 4 is a UV chart of an organosilicon polymer solution obtained in Example 4.

The organosilicon polymer thus obtained was measured by $^1$H-NMR (CDCl$_3$, δ). As a result, signals were observed at 0.4 (br. s, 82 H, SiMe), 1.3 (t, J=7Hz, 55H, SiCH$_2$, 3.9 (m, J=7Hz, 35M, SiOCH$_2$CH$_3$), 7.6 (m, 8H, —C$_4$H$_2$S-)- The organosilicon polymer had a Mw of 16,800 and an Mw/Mn of 2.69 (calculated as a polystyrene). The substituent ratio (A:OR:Me) by number was 6:28:66 (A=—C$_4$H$_2$S—). The UV spectrum of the product showed that it was a network polymer. The UV chart of the polymer solution thus obtained (10$^{-5}$ g of polymer/1,000 ml of THF) is shown in FIG. 4.

While the invention has been described in detail and with reference to specific embodiments thereof, it will be apparent to one skilled in the art that various changes and modifications can be made therein without departing from the spirit and scope thereof.

What is claimed is:

1. A process for the preparation of an organosilicon polymer, which comprises reacting one equivalent of a bis(alkoxysilyl) compound represented by the following general formula (I):

$$R^1R^2R^3Si—(A)_p—SiR^1R^2R^3 \qquad (I)$$

wherein R$^1$, R$^2$ and R$^3$ each represents the same or different substituted or unsubstituted monovalent hydrocarbon group, or an alkoxy group, with the proviso that at least one of R$^1$, R$^2$ and R$^3$ is an alkoxy group; A represents a divalent aromatic group, a divalent conjugated or nonconjugated unsaturated aliphatic group, or a divalent saturated aliphatic group; and p represents an integer of 1 or more, with one or more equivalents of an alkoxydisilane represented by the following general formula (II):

$$(OR^4)_{6-n}Si_2(R^5)_n \qquad (II)$$

wherein $R^4$ and $R^5$ each represents the same or different substituted or unsubstituted monovalent hydrocarbon group; and n represents an integer of from 0 to 5, in the presence of an alkali metal alkoxide represented by the following general formula (III):

$$MOR^6 \qquad (III)$$

wherein M represents an alkali metal; and $R^6$ represents a substituted or unsubstituted monovalent hydrocarbon group.

2. The process as claimed in claim 1, wherein the bis-(alkoxysilyl) compound is selected from the group consisting of a bis (alkoxysilyl) benzene, a bis (alkoxysilyl) ethylene, a bis (alkoxysilyl) ethenylene, a bis (alkoxysilyl) thiophene and the corresponding compounds where part of all of the alkoxy groups are replaced by an ethoxy group, an n-propoxy group, or an isopropoxy group in compounds selected from said group.

3. The process as claimed in claim 1, wherein the alkoxydisilane is selected from the group consisting of a monomethoxydisilane, a 1,2-dimethoxydisilane, a 2,2-dimethoxydisilane, a 1,2,2-trimethoxydisilane, a 2,2,2-trimethoxydisilane, a 1,1,2,2-tetramethoxydisilane, a 1,2,2,2-tetramethoxydisilane, a pentamethoxydisilane, a hexamethoxydisilane, and the corresponding compounds where part or all of the methoxy groups are replaced by an ethoxy group, an n-propoxy group, or an isopropoxy group in compounds selected from said group.

4. The process as claimed in claim 1, wherein the alkali metal alkoxide is sodium methoxide, sodium ethoxide, potassium-tert-butoxide or a lithium alkoxide.

5. The process as claimed in claim 1, wherein the alkali metal alkoxide is used in an amount of from 0.001 to 50 mol % per mole of the disilane.

6. The process as claimed in claim 1, wherein the reaction is conducted at a temperature of from −80° to 250° C.

* * * * *